United States Patent Office 2,711,961
Patented June 28, 1955

---

2,711,961

MAKING PAPER USING A MODIFIED UREA-FORMALDEHYDE RESIN

Walter M. Bruner, Wilmington, Del., assignor to E. I. du Pont de Nemours and Company, Wilmington, Del., a corporation of Delaware No Drawing. Application April 7, 1950,
Serial No. 154,720

7 Claims. (Cl. 92—21)

This invention relates to improvements in the manufacture of high wet-strength paper. More particularly, the invention is directed to a process for making paper wherein an improved composition is employed as an additive in the beater stage, or applied to the paper web by spraying or otherwise in a later stage in the paper making process.

Heretofore numerous methods have been proposed for imparting wet-strength to paper. For example, it was known heretofore that urea-formaldehyde condensation products are effective in imparting wet-strength to paper, especially when applied in a tub-sizing process. This method is inherently unattractive mainly because it requires the evaporation of large amounts of water after application. Various urea-formaldehyde compositions, which usually contain third resin-forming components to increase the rate of resin pickup have been made available commercially and are used in beater or head box applications. Melamine-formaldehyde resins also have been added to paper in the beater stage for the purpose of imparting high wet-strength. In general, paper which has been treated with any of the aforesaid reagents is subsequently dried and heated in order to cure the resin ingredients thus causing the cellulose fibers which make up the paper web to become bonded firmly together, whereby the wet-strength of the paper is materially improved.

In order to increase the affinity of urea-formaldehyde condensation products for cellulose, and to impart wet-strength to the paper more efficiently, numerous modifiers for the urea-formaldehyde condensation products have been employed. For example, glycine and protein materials, such as gelatin, have been used for this purpose. Other modifying agents which have been employed in a similar manner include the bisulfites of inorganic and organic bases. In general, the best of the previously known modified urea-formaldehyde condensation products, when employed in sufficient quantity to give treated paper containing about 0.5 to 2% of resin, produce paper in which the wet-strength amounts to only about 25% to 30% of the dry strength of the untreated paper. Melamine-formaldehyed is much more effective, and paper impregnated with 0.5 to 2% of melamine-formaldehyde has wet-strengths amounting to about 50% to 65% of the dry-strengths of the untreated paper. In copending application S. N. 148,757 of Lehr, O'Flynn and Tompson, filed March 9, 1950, now Patent No. 2,557,299, it is disclosed that urea-formaldehyde condensation products which have been modified with a compound of the class consisting of diglycolic acid and ammonium or alkali metal salts thereof also are highly effective in increasing the wet-strength of paper.

An object of this invention is to provide improvements in the manufacture of modified urea-formaldehyde condensation products which are of value as agents for imparting wet-strength to paper. Another object is to provide a relatively stable modified urea-formaldehyde composition which is effective as an agent for improving wet-strength when employed in spray application, tub-sizing, or beater application. Other objects of the invention will appear hereinafter.

It has been discovered in accordance with this invention that high wet-strength paper can be formed from paper materials by treatment with urea-formaldehyde condensation products which have been modified with hexamethylene diamine. It has also been discovered in accordance with this invention that a modified urea-formaldehyde composition having exceptionally high affinity for cellulose can be prepared by condensing urea with formaldehyde and with 5 to 30 (preferably 10 to 20) parts by weight of hexamethylene diamine per 100 parts of combined urea and combined formaldehyde. If desired a preformed methylol urea may be employed in place of the said urea-formaldehyde mixture. The ratio of combined formaldehyde to combined urea in the final resin should be within the range of about 1.5:1 to 3:1 (mol proportions).

Any unpolymerized urea-formaldehyde composition having the appropriate mol ratio of combined formaldehyde to combined urea may be employed in the practice of this invention. Urea-formaldehyde compositions which are obtained by admixing urea with the formalin give rather satisfactory results. Similar results are obtained using dimethylol urea solutions. The preferred urea-formaldehyde compositions are those which are obtained by the process described in the Kvalnes Patent Re. 23,174 (reissue date November 29, 1949). In the latter process a mixture of gaseous formaldehyde and water vapor, suitably the mixture which is obtained by oxidation of methanol, is cooled from a temperature above 90° C. to a temperature within the range of 60° to 90° C. whereby a mixture having from 50% to 70% by weight of formaldehyde is obtained; the temperature of this liquid mixture is maintained continuously at 60° to 90° C. until the said liquid is brought into contact with urea. The addition of urea is carried out in the presence of a buffer which maintains the pH within the range of 7.0 to 9.0, and the amount of urea which is added is controlled so that the urea-formaldehyde product contains from 4.5 to 7 mols of formaldehyde per mol of urea. After addition of the urea, the mixture is at least momentarily heated at from 70° to 90° C. whereby a product which remains a clear liquid when cooled to 25° C. is obtained. This clear liquid is remarkably stable and does not become cloudy even when stored for prolonged periods of time. In practicing the present invention it is desirable to add urea to this clear liquid in order to adjust the formaldehyde:urea ratio to a value within the range of 1.5:1 to 3:1. The resulting mixture may thereafter be modified with hexamethylene diamine. Moreover, the hexamethylene diamine-modified urea-formaldehyde condensation products may be prepared as disclosed in copending application Ser. No. 154,727, filed April 7, 1950, now Patent No. 2,650,166.

It is to be understood of course that the hexamethylene diamine need not be introduced as such but may be added in the form of a salt, such as hexamethylene diamine diacetate. Hexamethylene diamine salts of inorganic acids may also be employed. In a preferred embodiment the quantities of organic acid (e. g. acetic acid) and hexamethylene diamine employed are adjusted to give a predetermined pH; for example, a most outstanding result is obtained when acetic acid and hexamethylene diamine are present in such relative quantities that a substantially neutral mixture is obtained before addition to the methylol urea (or other unpolymerized urea-formaldehyde) composition. This requires about 2.0 to 2.2 equivalents of acid per mol of hexamethylene diamine, which is the optimum acid:hexamethylene diamine ratio. Good results are also obtained when relatively smaller proportions of acid:hexamethylene diamine are employed. For example, when the mol ratio of acid:hexamethylene diamine is .05:1 the improvement in wet-strength is quite pronounced, although not as great as when higher acid:hexamethylene diamine ratios are employed.

The modified urea-formaldehyde may be applied to the cellulose fibers by any suitable methods, i. e. the paper material may be wet with the treating agent by spraying, dipping, soaking, etc.

The invention is illustrated further by means of the following examples.

*Example 1.*—A liquid urea-formaldehyde composition was prepared by cooling gaseous formaldehyde and water vapor having initially a temperature above 90° C. to a temperature of about 60° C., the weight of formaldehyde being about 60% of the weight of the resultant aqueous liquid, and thereafter admixing the said liquid with urea at a temperature of about 60° C. in the presence of a buffer which maintained a pH within the range of 7.0 to 9.0 (i. e. NaOH was added in sufficient quantity to produce this pH), until the mol ratio of free and combined formaldehyde to free and combined urea was about 5:1. To 150 grams of the resulting polymethylol urea composition was added 20.7 grams of urea which gave a methylol urea composition having a formaldehyde:urea ratio of 2.9:1. This was added to a mixture of hexamethylene diamine (13.5 grams) in water (10 grams) and acetic acid (16.5 grams) at a temperature of 58° C. During mixing the composition was kept warm, and was stirred, in order to produce a virtually homogeneous mixture. The mixing required about 4 minutes. The temperature was then increased to a maximum of 76° C. and after about 20 minutes of such heating the pH was about 5.0. Heating was continued for 13 minutes, after which the mixture was cooled, giving a clear colorless product having a pH of 3.6. The resulting mixture was permitted to stand for about one day, after which the viscosity was 500 cps. The solids content at this stage was 70% by weight. To obtain a mixture suitable for beater application this mixture was diluted with water to give a clear dispersion (or solution) having a solids content of 0.5% by weight. Unbleached kraft pulp of Canadian freeness 500 was weighed out in sufficient quantity to give 2.5 grams of paper pulp (dry weight). To the kraft pulp was added 110 grams of water and the mixture was agitated with a stainless steel stirrer. A sufficient quantity of the 0.5% dispersion was added to obtain 1% resin in the slurry based on the weight of the dry pulp. Four milliliters of 5% aqueous alum (iron free) was added as the beating continued. The pH of the slurry after 10 minutes' beating was 4.1. The pulp was transferred to a sheet mold and a sheet was formed and drum-dried at 240° F. after which it was cured at 250° F. for 0.5 hour. The sheet stood for 2 hours before testing. The wet burst strength (after 20 minutes' soaking) was about 50 to 55% (in two measurements the actual percentages were 50% and 55% respectively) of the dry burst strength of the untreated paper. In the same way, the same modified urea-formaldehyde composition was employed using 3% resin in the beater (based on the weight of dry pulp). The wet burst strength was about 85% (actual percentages were 82 and 87.5%) of the dry burst strength of the untreated paper. These wet burst strengths are considerably higher than the wet burst strengths of paper similarly treated with melamine-formaldehyde resin.

*Example 2.*—A liquid urea-formaldehyde composition was prepared by cooling gaseous formaldehyde and water vapor having initially a temperature above 90° C. to a temperature of about 60° C., the weight of formaldehyde being about 60% of the weight of the resultant aqueous liquid, and thereafter admixing the said liquid with urea at a temperature of about 60° C. in the presence of a buffer which maintained a pH within the range of 7.0 to 9.0 (i. e. NaOH was added in sufficient quantity to produce this pH), until the mol ratio of free and combined formaldehyde to free and combined urea was about 5:1. To 150 grams of the resulting polymethylol urea composition was added 20.7 grams urea which gave a methylol urea composition having a formaldehyde:urea ratio of 2.9:1. This was added to a mixture of hexamethylene diamine (13.5 grams) in water (10 grams) and acetic acid (16.5 grams) at a temperature of 40° C. During the mixing the composition was kept warm and was stirred, in order to produce a virtually homogeneous mixture. The mixing required about 5 minutes. The temperature was then increased to a maximum of 75° C. Heating was continued for 30 minutes, after which the mixture was cooled, giving a clear colorless product having a pH of 3.9. The resulting mixture was permitted to stand for about one day, after which the viscosity was about 750 cps. The solids content at this stage was 70% by weight. To obtain a mixture suitable for beater application, this mixture was diluted with water to give a clear dispersion (or solution) having a solids content 0.5% by weight. Samples of treated paper were prepared using this mixture as described in Example 1. At a concentration of 1% resin in the slurry based on the weight of the dry pulp, the wet burst strength (after 20 minutes' soaking), was 70% of the dry burst strength of the untreated paper. In the same way, the same modified urea-formaldehyde composition was employed using 3% resin in the beater (based on the weight of the dry pulp). The wet burst strength was 85% of the dry burst strength of the untreated paper.

*Example 3.*—A liquid urea-formaldehyde condensation product having a formaldehyde:urea ratio of 2.9:1 and a pH of 3.9 was prepared as described in Example 2. To 55 grams of this urea-formaldehyde composition (pH 3.9) was added sufficient NaOH (40%) to bring the pH to 5.7. The resulting mixture was permitted to stand for several hours, after which the viscosity was 225 cps. The solids content at this stage was about 70% by weight. To obtain a mixture suitable for beater application, this mixture was diluted with water to give a clear dispersion (or solution) having a solids content of 0.5% by weight. Samples of paper were prepared under the conditions described in Example 1. At a concentration of 1% resin in the slurry based on the dry pulp, the wet burst strength (after 20 minutes' soaking) was 48.5% of the dry burst strength of the untreated paper. In the same way, the same modified urea-formaldehyde composition was employed using 3% resin in the beater (based on the weight of the dry pulp). The wet burst strength was 80.5% of the dry burst strength of the untreated paper.

*Example 4.*—A liquid urea formaldehyde composition was prepared by cooling gaseous formaldehyde and water vapor having initially a temperature above 90° C. to a temperature of about 60° C., the weight of formaldehyde being about 60% of the weight of the resultant aqueous liquid, and thereafter admixing the said liquid with urea at a temperature of about 60° C. in the presence of a buffer which maintained a pH within the range of 7.0 to 9.0 (i. e. NaOH was added in sufficient quantity to produce this pH), until the mol ratio of free and combined formaldehyde to free and combined urea was about 5:1. To 150 grams of the resulting polymethylol urea composition was added 27.7 grams of urea which gave a methylol urea composition having a formaldehyde:urea ratio of 2.5:1. This was added to a mixture of hexamethylene diamine (12.5 grams) in water (10 grams) and acetic acid (14.5 grams) at a temperature of 53° C. During mixing the composition was kept warm and was stirred, in order to produce a virtually homogeneous mixture. This mixing required about 5 minutes. The temperature was then increased to a maximum of 77.5° C. and heated for 30 minutes, after which the mixture was cooled giving a clear colorless product having a pH of 3.6. On standing for 30 minutes this resulting mixture set to a gel. Enough water (30 grams) was added to this mixture (75 grams) to decrease the solids content from 70% to 50% by weight. This mixture was agitated at room temperature for 45 minutes. The gel dissolved to give a clear dispersion (or solution) of about 100 cps. in viscosity. This dispersion (or solution) was partially neutralized with 5% NaOH to give a pH of 5.6. To obtain a mixture suitable for beater application, this mixture was diluted with water to give a clear dispersion (or solution) having a solids content of 0.5% by weight. Samples of paper were prepared under the conditions described in Example 1. At a concentration of 1% resin in the slurry based on the dry pulp, the wet burst strength (after 20 minutes soaking) was 54.5% of the dry burst strength of the untreated paper. In the same way, the modified urea-formaldehyde composition was employed using 3% resin in the beater (based on the weight of the dry pulp). The wet burst strength was 79% of the dry burst strength of the untreated paper.

*Example 5.*—To determine the effect of hexamethylene diamine upon the affinity of cellulosic paper material for urea-formaldehyde condensation product two comparative experiments were made. In the first experiment, unbleached kraft pulp in the form of a slurry containing 3% by weight cellulose fiber was beaten at a pH of 4.0 for 1 hour. To this was added a 73% aqueous solution of partially polymerized dimethylol urea having a pH of 7.3 and a viscosity of 884 cps. (3% of the weight of the dry pulp), and the beating was continued for one hour. The mixture was then filtered through a 28 mesh screen, giving a filtrate containing cellulosic fines. To remove the latter the filtrate was passed through filter paper. The pH of this final filtrate was 5.1. To 150 grams of the filtrate was added 20 milliliters of 85% phosphoric acid, and the resulting solution was distilled for removal of formaldehyde and water until a residue weighing about 25 grams remained. Additional water was added and the distillation was repeated. The distillates were analyzed for formaldehyde, and the quantity of urea-formaldehyde absorbed in the paper was determined from the difference between the total formaldehyde initially used and the formaldehyde recovered by the acid hydrolysis of the unabsorbed methylol urea. This was found to be 0.65% based on the weight of dry pulp. In the second experiment the same amount of pulp and dimethylol urea was used, the conditions being similar to those used in the first experiment except for the addition of 18% by weight of hexamethylene diamine based on the weight of dimethylol urea. The pH of the filtrate obtained in the same way as in the first experiment was 8.5. The weight of urea-hexamethylene diamine-formaldehyde absorbed by the paper was 1.1% of the weight of the dry pulp. These experiments showed that while the pick-up of urea-formaldehyde by the cellulose was only about 22% efficient (i. e. 22% of the resin was absorbed) in the absence of hexamethylene diamine, the efficiency was increased to about 36% by modifying the urea-formaldehyde with hexamethylene diamine.

*Example 6.*—A liquid urea-formaldehyde composition was prepared by cooling gaseous formaldehyde and water vapor having initially a temperature above 90° C. to a temperature of about 60° C., the weight of formaldehyde being about 60% of the weight of the resultant aqueous liquid, and thereafter admixing the said liquid with urea at a temperature of about 60° C. in the presence of a buffer which maintained a pH within the range of 7.0 to 9.0 (i. e. NaOH was added in sufficient quantity to produce this pH), until the mol ratio of free and combined formaldehyde to free and combined urea was about 5:1. To 128.7 grams of the resulting polymethylol urea was added 43.9 grams of urea, which gave a methylol urea composition having a formaldehyde:urea ratio of 1.95:1. To this was added 170 grams of water and the mixture was heated with stirring (pH=6.5) for 30 minutes at a maximum temperature of 53° C. To the resulting mixture was added 10.7 grams of hexamethylene diamine in 25 milliliters of water, slowly (time, 10 minutes) with stirring. A fluffy precipitate results. At this stage the pH of the mixture was 8.0. With constant stirring, 1.2 grams of p-toluene sulfonic acid in 10 milliliters of water was added. The pH of the suspension was thus decreased to 7.5. The temperature was then raised to a maximum of 73° C., at which temperature the mixture was heated for 2.0 hours. An almost clear solution, which became cloudy on cooling, resulted. This solution had a pH of 6.15. Sodium hydroxide aqueous solution (25% NaOH) was added to bring the pH to 8.4; the resulting mixture had a viscosity of 85 cps. The solids content was then reduced to 3% by dilution with water, and the pH was brought to 5.5 by addition of 0.5 N HCl. Sheets of machine-made, unbleached, unsized, untreated kraft paper, 7 inches by 7 inches in size, each weighing about 1.8 grams, were conditioned by storing at 25° C., 50% relative humidity, for 24 hours (A. S. T. M. D685–44). The sheets were then weighed. The sheets were then sprayed uniformly on each side with this hexamethylene diamine-modified urea-formaldehyde composition, using a spray gun. The sprayed papers were then squeezed between rubber rolls and dried on a drum drier at a temperature of about 250° F. for about 0.5 to 1.0 minute. The impregnated sheets were cured in an oven containing circulating air at a temperature of 248° F. for 30 minutes. After this the sheets were reconditioned at a temperature of 25° C. (50% relative humidity), for 24 hours and reweighed. The resin content of the paper as determined by the weight increase was 2.0 to 2.5%, based on the total weight of the untreated sheet. The dry burst strength of the treated sheet (Mullen test, A. S. T. M. D774–46) was 29 to 33 pounds per square inch; the corresponding dry burst strength of the same sheet material without treatment was about 31 pounds per square inch. Wet strength of untreated sheets after 20 minutes soak was about zero. Samples of the treated sheets were soaked in water for 15 seconds and 20 minutes respectively. The burst strengths of these wet sheets were found to be 25% to 35% of the corresponding dry burst strengths of the untreated sheets.

*Example 7.*—To 100 grams of polymethylol urea composition ($F/U=5/1$) prepared as described in Example 6 was added 23.8 grams of urea, giving an F:U ratio of 2.2:1. Hexamethylene diamine (7.7 grams) was then added and a white solid settled out. The mixture was stirred for 10 minutes at high speed, and a well dispersed mixture was thus obtained. This was buffered with monosodium dihydrogen phosphate and sodium hydroxide to a pH of 8.8. This was heated at 123° to 132° C. at a maximum pressure of 132 pounds per square inch (gauge) for 67 minutes. A clear resin mixture having a pH of 7.7 and a viscosity of 150 cps. results. The mixture was water-soluble and stable, and had a solids content of 67%. This was diluted to a solids contents of 0.5% and the resulting solution was employed in beater application (including the beating and curing steps) as described in Example 1. At 3% resin content in the treated sheet the wet burst strength was 6.25% of the dry burst strength of the untreated paper. A urea-formaldehyde composition prepared as above described but without modification with hexamethylene diamine was similarly employed in beater application, and the resulting treated paper had a wet burst strength of zero. These results illustrate the wet strengths obtained in beater applications with urea-formaldehyde which has not been bodied by acid prior to dilution, and they also illustrate the improvement obtained by the use of the hexamethylene diamine modifier, even with the said unbodied urea-formaldehyde condensation products.

*Example 8.*—To demonstrate that the hexamethylene diamine may first be condensed with formaldehyde and thereafter admixed with dimethylolurea an experiment was made as follows. An aqueous solution (weight 200 grams) containing 56 grams of hexamethylene diamine was mixed with 200 grams of aqueous 37% formaldehyde solution, and a polymer was formed instantaneously. This mixture was agitated with aqua ammonia and filtered through cheese cloth, after which it was washed 8 times with distilled water and dried in air overnight. After this it was dried in an oven at 70° C. for 2 hours. To 20 grams of this mixture 180 grams of water was added and glacial acetic acid (7 cc.) was added dropwise until the polymer dissolved. The acetic acid:hexamethylene diamine mol ratio in this experiment was 1.16:1. A 3% paper pulp dispersion was prepared as in Example 5. To this was added the hexamethylene diamine-formaldehyde-acetic acid composition, and thereafter partially polymerized aqueous dimethylol urea (pH=7.3, viscosity 100 to 200 cps.) was introduced. The amount of dimethylol urea was 3% of the weight of the dry pulp and the amount of hexamethylene diamine-formaldehyde was 7% of the weight of the dimethylol urea. The beating procedure was carried out as in Example 5. The pH of the filtrate thus obtained was 4.5. The amount of resin mixture absorbed on the fiber was 0.66% based on the weight of dry pulp. A control experiment was made under similar conditions using partially polymerized dimethylol urea of the same viscosity; the amount of resin absorbed on the fiber in this control test was only 0.05%, based on the weight of the dry fiber.

From the foregoing examples it is evident that hexamethylene diamine has a highly beneficial effect on the absorption of urea-formaldehyde by cellulosic paper materials, and on the wet burst strengths of the resulting products. The amount and strength of acid which may be added to the hexamethylene diamine prior to or after admixing it with the urea-formaldehyde condensation product should be controlled so as to avoid the undesirable effects of excessive acidity (gelation, etc.); it is thus desirable to control the amount of acid so that the pH does not drop below 3 prior to treating the paper with the hexamethylene diamine-modified urea-formaldehyde reaction product.

The order in which the various ingredients are introduced may be varied if desired. For example, the formaldehyde may first be admixed with a neutral hexamethylene diamine salt, and the urea may thereafter be introduced. Alternatively, the acid may be added to a methylol urea-hexamethylene diamine mixture. Other methods of admixing the ingredients may also be employed. Moreover, the cellulosic paper material may be added at any stage in the process; i. e., the order of adding this ingredient may also be varied as desired.

The minimum quantity of hexamethylene diamine modified urea-formaldehyde which produces a beneficial effect is extremely small, but in most instances it is desirable to employ at least about 0.1% of the resin, based on the weight of the dry untreated paper, because, at lower resin contents, uneven distribution of the resin may produce weaknesses in local areas, and as a result relatively poor results may thus be obtained when the resin content is too low. The maximum quantity of resin which can be tolerated is limited only by the capacity of the paper to absorb the resin without becoming too thick and inflexible; generally the resin content need not exceed about 25%, and since highly satisfactory results are obtained at resin contents of 2% and lower, the preferred range of resin content is about 0.5 to 3.0.

The paper products obtained in accordance with this invention are highly valuable and useful in the manufacture of toweling, wrappings, bags, wall-paper, glassine, adhesively bonded laminated articles, and other applications for which high wet-strength paper is commonly employed. The invention is based largely upon the discovery that hexamethylene diamine increases the affinity of cellulosic paper material for urea-formaldehyde condensation products. The invention may therefore be employed in any process requiring increased pick-up of urea-formaldehyde by cellulosic paper material. In general, however, the invention is directed to manufacture of treated paper and more particularly to the manufacture of paper having improved strength properties, rather than molded products. It is to be recognized that the composition employed in the practice of this invention may be varied, depending upon the particular use or process in which it is to be employed. When an acid component is employed, for example, the selection of the particular acid may depend upon such factors as solubility, etc. Suitable acids include the water-soluble alkanoic acids, e. g. acetic, propionic, isobutyric, glutaric, adipic, etc., as well as other water-soluble and slightly water-soluble acids such as benzoic, lauric, hydroxyacetic, diglycolic, p-toluene sulfonic, polymethacrylic, formic, maleic, aminoacetic, phosphoric, etc. Acid generating substances or latent acid catalysts may also be used, as well as substances, such as ammonium hydroxyacetate, which form acid on hydrolysis. The acid need not all be combined in the final composition in the form of a salt of hexamethylene diamine, but for most applications very large excesses of acid component should be avoided if best results are desired. Moreover, for certain practical applications, as illustrated above, no acid ingredient need be present.

Having now particularly described and ascertained the nature of the said invention and in what manner the same is to be performed, I declare that what I claim is:

1. In a process for the manufacture of paper having improved strength properties the steps which comprise impregnating cellulosic paper material with from 0.5% to about 25%, based on the dry weight of the paper, of a urea-formaldehyde condensation product, modified with hexamethylene diamine, sheeting the resulting mixture, and polymerizing the said condensation product in the sheet in the presence of an acidic urea-formaldehyde polymerization catalyst, said modification with hexamethylene diamine resulting from the addition of hexamethylene diamine to urea-formaldehyde prior to polymerization, the quantity of hexamethylene diamine being from 5 to 30 parts by weight per 100 parts of combined urea and formaldehyde, said impregnating being accomplished by admixing the cellulosic paper material with a liquid composition in which the sole formaldehyde-reactive resin-forming ingredients are urea and hexamethylene diamine.

2. The process of claim 1 in which the said modified urea-formaldehyde condensation product is a condensation product of hexamethylene diamine, an organic acid, and a methylol urea, said methylol urea having a formaldehyde:urea mol ratio of 1.5:1 to 3:1.

3. The process of claim 2 in which the number of equivalents of organic acids is within the range of 0.05 to 2.2 per mol of hexamethylene diamine.

4. The process of claim 2 in which the number of equivalents of organic acid is within the range of 2.0 to 2.2 per mol of hexamethylene diamine.

5. The process of claim 4 in which the said acid is acetic acid.

6. In a process for preparing a paper-treating composition which is useful as an impregnating agent for imparting high wet-strength to paper the steps which comprise admixing 5 to 30 parts by weight of hexamethylene diamine with 100 parts by weight of urea-formaldehyde in an aqueous medium while controlling the pH so that it does not drop below 3, the pH of the urea-formaldehyde composition being initially within the range of 7.0 to 9.0, said urea-formaldehyde composition being a clear stable liquid obtained by liquefying a mixture of gaseous formaldehyde and water vapor having a temperature above 90° C. by cooling to a temperature of 60° to 90° C., the weight of the formaldehyde being from 50% to 70% of the weight of the resultant aqueous liquid mixture, keeping the temperature of the said aqueous liquid continuously at 60° to 90° C. until the said liquid is brought into contact with urea, admixing urea with the said liquid in the presence of a buffer which maintains the pH within the range of 7.0 to 9.0, the amount of the said urea being in the proportion of 1 mol per 4.5 to 7 mols of the said formaldehyde, and maintaining the temperature of the resultant liquid at least momentarily at from 70° to 90° C., whereby the said clear stable urea-formaldehyde liquid composition is obtained, the formaldehyde:urea mol ratio in the said composition being adjusted to from 1.5:1 to 3:1 by addition of urea prior to the addition of the hexamethylene diamine.

7. In a process for preparing a paper-treating composition which is useful as an impregnating agent for imparting high wet-strength to paper the steps which comprise admixing urea with a stable liquid urea-formaldehyde aqueous composition, the relative quantities of urea and the said stable liquid urea-formaldehyde composition being such that the final mol ratio of formaldehyde:urea is within the range of 1.5:1 to 3.1, said stable liquid urea-formaldehyde composition being the product obtained by liquefying a mixture of gaseous formaldehyde and water vapor having a temperature above 90° C. by cooling to a temperature of 60° to 90° C., the weight of formaldehyde being from 50% to 70% of the weight of the resultant aqueous liquid mixture, keeping the temperature of the said aqueous liquid continuously at 60° to 90° C., until the said aqueous liquid is brought into contact with urea, admixing urea with the said aqueous liquid in the presence of a buffer which maintains the pH within the range of 7.0 to 9.0, the amount of the said urea being in the proportion of 1 mol per 4.5 to 7 mols of the said formaldehyde, and maintaining the temperature of the resultant liquid at least momentarily at from 70° to 90° C., whereby a product which remains a clear liquid when cooled to 25° C. is obtained, and thereafter adding hexamethylene diamine to the said urea-formaldehyde composition having a formaldehyde:urea ratio of from 1.5 to 3, the quantity of the hexamethylene diamine being from 10 to 20 parts by weight per 100 parts of urea-formaldehyde, the pH of the mixture being controlled so that it does not drop below 3 during the reaction of the hexamethylene diamine and the urea-formaldehyde composition.

References Cited in the file of this patent

UNITED STATES PATENTS

| Number | Name | Date |
|---|---|---|
| 1,695,912 | Brown | Dec. 18, 1928 |
| 2,309,090 | Bauer et al. | Jan. 26, 1943 |
| 2,315,128 | Newkirk | Mar. 30, 1943 |
| 2,325,302 | Britt | July 27, 1943 |
| 2,334,545 | C'Alelio | Nov. 16, 1943 |
| 2,338,602 | Schur | Jan. 4, 1944 |
| 2,345,543 | Wohnsiedler et al. | Mar. 28, 1944 |
| 2,485,079 | Wohnsiedler et al. | Oct. 18, 1949 |
| 2,485,485 | Dudley | Oct. 18, 1949 |
| 2,565,152 | Wachter et al. | Aug. 21, 1951 |

FOREIGN PATENTS

| Number | Country | Date |
|---|---|---|
| 572,245 | Great Britain | Sept. 28, 1945 |